United States Patent [11] 3,607,367

[72] Inventors Lee C. McCandless
 Reston, Va.;
 James C. Withers, Accokeek, Md.
[21] Appl. No. 717,896
[22] Filed Apr. 1, 1968
[45] Patented Sept. 21, 1971
[73] Assignee General Technologies Corporation
 Reston, Va.
 Continuation-in-part of application Ser. No.
 519,625, Jan. 10, 1966, now abandoned.

[54] HIGH-STRENGTH, HIGH-MODULUS, LOW
 DENSITY, BORON SILICIDE MONOFILAMENTS,
 AND METHOD OF MAKING SAME
 3 Claims, No Drawings
[52] U.S. Cl. .................................................... 117/106 A,
 117/128, 117/135.1
[51] Int. Cl. ...................................................... C23c 11/08
[50] Field of Search ........................................... 117/106,
 106 D, 106 A, 106 B, 121, 135.1

[56] References Cited
 UNITED STATES PATENTS
2,920,006  1/1960  Yntema et al. ............... 148/6.3
3,017,251  1/1962  Kelemen ...................... 23/223.5
3,090,702  5/1963  Commanday et al. ........ 117/106
3,138,468  6/1964  Matkovich et al. ........... 106/55
3,275,414  9/1966  Colton .......................... 23/204

OTHER REFERENCES

Campbell et al., Trans. of the Electrochem. Soc., Vol. 96, No. 5, Nov. 1949, Pages 318–333 relied upon.

Primary Examiner—Ralph S. Kendall
Attorney—Lawrence R. Brown

ABSTRACT: This invention relates to high-strength, high-modulus low density boron silicide monofilaments, and to a method of making the same. The boron silicide monofilaments herein comprise a coating of about 40–70 wt. percent boron and about 60–30 wt. percent silicon on a substrate wire. The method for preparing such boron solicide monofilaments comprises reacting a boron halide, such as boron trichloride, silane and hydrogen in the vapor phase at elevated temperatures, e.g. about 1,000°–1,300° C. The reaction is carried out at atmospheric pressure. Usually the boron trichloride, silane and hydrogen are present in a concentration of about 10–40 mole percent, 0.1–1.5 mole percent and 55–90 mole percent, respectively.

HIGH-STRENGTH, HIGH-MODULUS, LOW DENSITY, BORON SILICIDE MONOFILAMENTS, AND METHOD OF MAKING SAME

CONTINUATION-IN-PART

This invention is a continuation-in-part of Ser. No. 519,625, filed Jan. 10, 1966, now abandoned.

GOVERNMENT CONTRACT

The invention herein described was made under a contract with the Department of the Air Force.

DISCLOSURE OF INVENTION

The boron silicide monofilaments of the present invention are distinguished by especially high-strength and high-modulus properties, but low density. They are very light in weight, but are able to withstand great stresses, high temperatures and effects of corrosive forces. The filaments usually are made continuous in length, and they are cut to any desired given length for use in application. The filaments are utilized principally in the manufacture of high-strength filament-reinforced composites. The combination of such filamentary materials of high-tensile strength and of high sonic modulus with light weight matrix materials of lower strength and lower modulus leads to high-strength composites of low density.

The boron silicide monofilaments of the invention comprise a substrate or core, usually of a fine wire, on which a coating of boron silicide material is deposited from the vapor phase. The substrate may be any substance which is capable of withstanding high temperatures, and which can be made in the form of an elongated wire or filament of a fine and constant diameter. Generally the substrate wire is metallic, such as tungsten, molybdenum and the like, although nonmetallic materials, as for example, quartz, silica-coated carbon, metallic-coated glass filaments and other high strength filaments such as boron, graphite, silicon carbide and the like may be used as well.

A particularly useful core material is tungsten, which fulfills all the requirements listed above and is commercially available in large quantities, too. Tungsten also has especially good crystal orientation wherein the crystals are oriented lengthwise. The longitudinal orientation of the crystals of a tungsten wire substrate is considered advantageous because the orientation of the material deposited on the substrate tends at least initially to follow the orientation of the substrate crystals. Another advantageous feature of tungsten is its chemical absorption properties which make it a good catalytic agent for the vapors within the deposition chamber.

In operation, the substrate wire is heated to an elevated temperature suitable for deposition of boron silicide thereon from a chemical reactant system in the vapor phase. The substrate usually is heated to the deposition temperature by passing electrical current therethrough, although induction or dielectric coupling, or external radiation sources may be used as well.

For use as a reinforcement filament in structural bodies, e.g. aircraft, it is desirable that the filaments exhibit a low density as well as high-strength properties. However generally the substrate wire material possesses a very much higher density and lower strength than the coating material itself. Therefore, to minimize the overall density of the filament, it is preferred that the diameter of the substrate be made small compared to the diameter of the coating itself. Of course, for those substrate wires which may be themselves of a very low or lower density than the coating this difference is not necessary. Generally, however, the substrate comprises only a few percent of the cross-sectional area of the entire filament. Preferably the high-strength coating is built-up on the substrate wire so that it comprises at least 93 percent of the cross-sectional area of the filament. Usually the diameter of the substrate is about 0.0005–0.001 inches and the coating has a diameter of about 0.002–0.004 inches or more. These dimensions, however, may vary widely depending upon the ease of handling the continuous filaments, and the specific application chosen for a given reel of filament material.

In accordance with a feature of the present invention, there is provided a method of making continuous boron silicide filaments of high-strength, high-modulus and low density at a rapid deposition rate. The method comprises contacting a substrate wire heated at a deposition temperature with a reactant mixture of a boron halide, silane and hydrogen in the vapor phase. In a preferred embodiment of the invention the boron halide is boron trichloride. The deposition usually is carried out conveniently at atmospheric pressure.

The boron trichloride, silane and hydrogen suitably are present in the reactant mixture in a concentration of about 10–40 mole percent, 0.1–1.5 mole percent, and 55–90 mole percent, respectively, at a substrate temperature of about 1000°–1300 C. Preferably the respective concentrations for higher strength, lower density coatings are 20–35 mole percent, 0.2–1.0 mole percent and 65–80 mole percent. A more nearly optimum reactant concentration is 25, 0.7 and 75. The coatings deposited therefrom are made up of about 40–90 wt. percent boron and 60–10 wt. percent silica.

The boron silicide filaments of the invention possess a tensile strength of at least $28 \times 10^3$ p.s.i., a sonic modulus of at least 599,564, 10p.s.i., a coating density of less than about 2.2 g./cc. Usually, however, the tensile strength is at least 100,000 p.s.i., the sonic modulus is at least $50 \times 10^6$ p.s.i., the coating density is less than about 2.0 g./cc.

The apparatus employed for preparation of the continuous filaments of this invention is substantially the same as described in detail in the copending patent application, Ser. No. 599,564, filed Dec. 6, 1966, now abandoned. Such an apparatus includes a number of vessels arranged in series. The first vessel is a preheat chamber, in which the substrate wire is cleaned by heating in a hydrogen atmosphere. The cleaned substrate wire then passes through a nucleation chamber in which a flash surface layer of the coating material is formed on the cleaned substrate wire. Finally the substrate wire with the flash coating thereon enters a deposition chamber in which a thick deposit of the coating material is formed on the surface layer. In practice, one or more preheat, nucleation and deposition chambers may be included as part of the apparatus for making the monofilaments.

A suitable separate supply of the reactant mixture gases usually is provided to each of the nucleation and deposition chambers. The reactant gases also may be led into a separate gas mixing chamber prior to admission into the particular nucleation or deposition chamber. The gas flow rate for each reactant is monitored in each chamber.

The substrate wire is fed through the series of chambers from a supply reel at a predetermined rate, and the finished filament product is stored in a takeup reel. Usually the substrate wire is moved at a rate which is related to the rate of deposition of the coating material. The deposition rate is very high for such filaments, usually about 0.5 mils/min., and the substrate wire is moved at a rate of about one-third to 1 ft./min.

During this process the substrate wire is heated to an elevated temperature suitable for deposition of boron silicide thereon from the gaseous reactants in the vapor phase. A suitable temperature range is about 1000°–1300° C.

The Table below summarizes the preparation and properties of representative continuous boron silicide filaments of the invention. All the filaments listed in the Table were made at a deposition temperature of 1050° C., with the exception of Run Nos. 1–A–15 and 1–A–16 which were made at 1000° C. The substrate was tungsten having a diameter of about 0.5 mils. The total monofilament diameter including coating was about 3 to 4 mils. Typical coating composition are 1–A–11, boron 41.2 percent by weight, silicon 58.8 percent by weight; 1–A–19, boron 65.4 percent by weight, silicon 34.6 percent by weight.

TABLE

| Run No. | Molar percent of reactants | | | Tensile strength ($10^3$ p.s.i.) | Sonic modulus ($10^6$ p.s.i.) | Coating density (g./cc.) |
|---|---|---|---|---|---|---|
| | $BCl_3$ | $SiH_4$ | $H_2$ | | | |
| 1-A-11 | 15.3 | 0.4 | 84.3 | | | |
| 1-A-12 | 15.3 | 0.8 | 83.9 | 138 | 31.4 | 1.99 |
| 1-A-13 | 15.1 | 1.5 | 83.4 | | | |
| 1-A-14 | 39.5 | 0.1 | 59.4 | 49 | 37.7 | 1.98 |
| 1-A-15 | 24.8 | 0.7 | 74.5 | 130 | 55.1 | 1.98 |
| 1-A-16 | 28.3 | 0.7 | 71.0 | 79 | 51.6 | 2.29 |
| 1-A-17 | 11.1 | 0.2 | 88.7 | 45 | 47.1 | 1.04 |
| 1-A-18 | 38.4 | 0.3 | 61.3 | 42 | 52.7 | 2.03 |
| 1-A-19 | 27.2 | 0.2 | 72.6 | 28 | 42.5 | 1.84 |
| 1-A-20 | 31.9 | 0.2 | 67.9 | 98 | 69.7 | 2.05 |

What we claim is:

1. A high-strength, high-modulus, low density boron silicide monofilament comprising:
   a. a monofilament substrate; and
   b. a boron silicide coating thereon wherein said coating amounts to at least 93 percent of the cross-sectional area of the filament and comprises about 40 percent to 70 percent wt. boron and about 60 percent to 30 percent wt. silicon.

2. A high-strength, high-modulus, low density boron silicide monofilament wherein the tensile strength is at least $28 \times 10^3$ p.s.i., and the sonic modulus is at least $30 \times 10^6$ p.s.i., said monofilament comprising:
   a. a monofilament substrate; and
   b. a boron silicide coating thereon, wherein the coating density is less than about 2.3 g./cc., said coating comprising about 40 70 percent wt. boron and about 60 percent–30 percent wt. silicon.

3. A method of making a high-strength, high-modulus, low density boron silicide monofilament which comprises, reacting a mixture of a boron halide, silane and hydrogen in the vapor phase at an elevated substrate temperature of about 1000° to 1300° C., wherein said boron trichloride is present in a concentration of about 10–40 mole percent of the reaction mixture, said silane is present in a concentration of about 0.1–1.5 mole percent of the reaction mixture, and said hydrogen is present in a concentration of about 55–90 mole percent of the reaction mixture.